US005807631A

United States Patent [19]

Moser

[11] Patent Number: 5,807,631

[45] Date of Patent: Sep. 15, 1998

[54] THERMALLY CONDUCTIVE VITON FOR REDUCING OPERATING TEMPERATURE OF NFFR FUSERS

[75] Inventor: Rabin Moser, Victor, N.Y.

[73] Assignee: Xerox Corporation, Stamford, Conn.

[21] Appl. No.: 886,051

[22] Filed: Jun. 30, 1997

[51] Int. Cl.$^{6}$ .......... B32B 5/16

[52] U.S. Cl. .......... 428/339; 428/418; 428/447; 428/448; 428/332; 428/906

[58] Field of Search .......... 428/418, 421, 428/422, 906, 463, 447, 448, 339, 358, 330, 411.1, 446, 457, 476, 688; 492/53, 54, 55, 56

[56] References Cited

U.S. PATENT DOCUMENTS 4,078,286 3/1978 Takiguichi et al. .......... 29/132
5,017,432 5/1991 Eddy et al. .
5,049,444 9/1991 Bingham et al. .
5,166,031 11/1992 Badesha et al. .
5,217,837 6/1993 Henry et al. .
5,601,926 2/1997 Moser .

*Primary Examiner*—Merrick Dixon

[57] ABSTRACT

A NFFR is disclosed which enables a NFFR fuser designed for one operating speed to be operated at a substantially greater speed while maintaining good wear and image gloss characteristics. A heated fuser roll member has a relatively thin outer layer which exhibits good wear and image gloss characteristics. The heated fuser roll member further includes an under layer contacting the outer layer which under layer is made thermally conductive. A third, thermally conductive layer is adhered to a conductive core and supports the under layer. The NFFR constructed according to the forgoing allows operation at a reduced set point temperature of 30° to 40° F. or in the alternative allowing for operation at a higher throughput speed at the higher set point temperature in lieu of operating at the lower set point temperature.

18 Claims, 2 Drawing Sheets

THERMALLY CONDUCTIVE VITON FOR REDUCING OPERATING TEMPERATURE OF NFFR FUSERS

BACKGROUND OF THE INVENTION

This invention relates generally to a heat and pressure fuser for an electrophotographic printing machine, and more particularly the invention is directed to a Nip Forming Fuser Roll (NFFR) structure for fusing color toner images at high speeds.

In a typical electrophotographic printing process, a photoconductive member is charged to a substantially uniform potential so as to sensitize the surface thereof. The charged portion of the photoconductive member is exposed to selectively dissipate the charges thereon in the irradiated areas. This records an electrostatic latent image on the photoconductive member. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules either to a donor roll or to a latent image on the photoconductive member. The toner attracted to a donor roll is then deposited on a latent electrostatic images on a charge retentive surface which is usually a photoreceptor. The toner powder image is then transferred from the photoconductive member to a copy substrate. The toner particles are heated to permanently affix the powder image to the copy substrate.

In order to fix or fuse the toner material onto a support member permanently by heat, it is necessary to elevate the temperature of the toner material to a point at which constituents of the toner material coalesce and become tacky. This action causes the toner to flow to some extent onto the fibers or pores of the support members or otherwise upon the surfaces thereof. Thereafter, as the toner material cools, solidification of the toner material occurs causing the toner material to be bonded firmly to the support member.

One approach to thermal fusing of toner material images onto the supporting substrate has been to pass the substrate with the unfused toner images thereon between a pair of opposed roller members at least one of which is internally heated. During operation of a fusing system of this type, the support member to which the toner images are electrostatically adhered is moved through the nip formed between the rolls with the toner image contacting the heated fuser roll to thereby effect heating of the toner images within the nip.

The heated fuser roll is usually the roll that contacts the toner images on a substrate such as plain paper. In any event, the roll contacting the toner images is usually provided with an abhesive material for preventing toner offset to the fuser member. Three materials which are commonly used for such purposes are PFAViton™ and silicone rubber. All of these materials,in order to maintain their abhesive qualities, require release agents specificto the material.

With the advent of color imaging using toner materials and the ever increasing speeds at which consumers want their copies produced, come the ever increasing problems associated with fusing such images at the higher speeds without sacrificing image quality and fuser roll life.

It is desirable that a heat and pressure roll fuser exhibit durability, good release and continued image gloss. In order to accomplish such objectives, the material used for the surface of the heated fuser roll must resist wear, be abhesive and be able to impart gloss to the color images. Pursuant to the contemplated use of the present fuser, it is desirable to provide the forgoing characteristics at operating speeds not before possible when fusing color images.

The object of this invention is to provide a NFFR that exhibits good release characteristics while imparting the desired gloss to color images without impeding heat flow and without limiting the operating speed of the NFFR.

Following is a discussion of prior art, incorporated herein by reference, which may bear on the patentability of the present invention. In addition to possibly having some relevance to the question of patentability, these references, together with the detailed description to follow, may provide a better understanding and appreciation of the present invention.

U.S. Pat. No. 5,601,926 granted to Rabin Moser on Feb. 11, 1997 discloses a long life heat and pressure roll fuser apparatus. The roll fuser apparatus is characterized by the provision of a heated fuser roll having a hard core with two discrete elastomeric layers thereon. The outer elastomeric layer is provided for its good toner release and copy quality properties. The other of the two elastomeric layer is selected for its high degree of resistance to wear due to paper edge contact.

U.S. Pat. No. 5,281,506 granted to Santokh S. Badesha et al on Jan. 25, 1994 discloses a fuser member comprising a supporting substrate having an outer layer of a cured fluoroelastomer and having a thin surface layer of a polyorganosiloxane having been grafted to the surface of said cured fluoroelastomer in the presence of a dehydrofluorination agent for the fluoroelastomer and from a polyorganosiloxane.

U.S. Pat. No. 5,219,612 granted to Patrick J. Finn et al on Jun. 15, 1993 discloses a method of using multilayered member for fusing thermoplastic resin toner images to a substrate in a fuser system of the type wherein a polymeric release agent having functional groups is applied to the surface of the fuser member. The multilayered fuser member has in sequential order a base support member, an adhesive layer comprising a copolymer of vinylidene fluoride and hexafluoropropylene and at least 20% by weight of the adhesive layer of a coupling agent comprising at least one organo functional silane and an activator, a tie coat layer of active ingredients comprising a copolymer of vinylidene fluoride and hexafluoropropylene and an outer elastomeric fusing surface comprising a copolymer of vinylidene fluoride and hexafluoropropylene and containing a metal oxide present in an amount sufficient to interact with a polymeric release agent having functional groups to provide an interfacial barrier layer between said fusing surface and toner.

U.S. Pat. No. 5,217,837 granted to Arnold W. Henry et al on Jun. 8, 1993 discloses a multilayered fuser member for fusing thermoplastic resin toner images to a substrate in a fuser system of the type wherein a polymeric release agent having functional groups is applied to the surface of the fuser member, the fuser member has a base support member, a thermally conductive silicone elastomer layer, an amino silane primer layer, an adhesive layer and an elastomer fusing surface comprising poly(vinylidenefluoride-hexafluoropropylenetetrafluoroethylene) a metal oxide present in the fusing surface to interact with the polymeric release agent to provide an interfacial barrier layer between the fusing surface and the toner and substantially unreactive with the elastomer.

U.S. Pat. No. 5,166,031 granted to Santokh S. Badesha et al on Nov. 24, 1992 discloses a fuser member comprising a supporting substrate having an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator.

U.S. Pat. No. 5,141,788 granted to Santokh S. Badesha on Aug. 25, 1992 relates to a fuser member comprising a supporting substrate having an outer layer of a cured fluoroelastomer and having a thin surface layer of a polyorganosiloxane having been grafted to the surface of said cured fluoroelastomer in the presence of a dehydrofluorination agent for the fluoroelastomer and from a polyorganosiloxane having reactive functionality.

U.S. Pat. No. 5,049,444 granted to George J. Bingham on Sep. 17, 1991 relates to a multilayered member for fusing thermoplastic resin toner images to a substrate in a fuser system of the type wherein a polymeric release agent having functional groups is applied to the surface of the fuser member. The multilayered fuser member has in sequential order a base support member, an adhesive layer comprising a copolymer of vinylidene fluoride and hexafluoropropylene and at least 20% by weight of the adhesive layer of a coupling agent comprising at least one organo functional silane and an activator, a tie coat layer of active ingredients comprising a copolymer of vinylidene fluoride and hexafluoropropylene and an outer elastomeric fusing surface comprising a copolymer of vinylidene fluoride and hexafluoropropylene and containing a metal oxide present in an amount sufficient to interact with a polymeric release agent having functional groups to provide an interfacial barrier layer between said fusing surface and toner.

U.S. Pat. No. 5,017,432 granted to Clifford O. Eddy, on Oct. 29, 1991 relates to a fuser member and fuser system of a type wherein a polymeric release agent having functional groups supplied to the surface of the fuser member has an elastomer fusing surface comprising poly(vinylidenefluoridehexafluoropropylene-tetrafluoroethylene) wherein the vinylidenefluoride is present in the amount less than 40 mole percent, a metal oxide is present in amounts sufficient to interact with the polymer release agent having functional groups to provide an interfacial barrier layer between the fusing surface and the toner and being substantially unreactive with the elastomer and wherein the elastomer is cured from a solvent solution thereof with a nucleophilic curing agent soluble in the solution and in the presence of less than 4 parts by weight of inorganic base per 100 parts by weight of polymer with the inorganic base being effective to at least partially dehydrofluorinate the vinylidenefluoride.

U.S. Pat. No. 4,257,699 granted to James A. Lentz on Mar. 24, 1981 relates to a fuser member, fuser assembly and method of fusing or fixing thermoplastic resin powder images to a substrate in a fuser assembly of the type wherein a polymeric release agent having functional groups is applied to the surface of the fuser member is disclosed. The fuser member comprises a base member having at least two layers of elastomer thereon, at least the outer layer elastomer surface having a metal-containing filler therein. Exemplary of such a fuser member is an aluminum base member coated with a first layer of poly(vinylidene fluoride-hexafluoropropylene) copolymer optionally having a metal-containing filler, such as lead oxide, dispersed therein and at least a second layer of poly(vinylidene fluoride-hexafluoropropylene) copolymer having metal-containing filler, such as lead oxide, dispersed therein coated upon said first layer.

U.S. Pat. No. 4,078,286 granted to Koichi Takiguchi on Mar. 14, 1978 relates to silicone rubber is employed as an outer coating material on a fuser member and is applied to the base member by means of a novel construction which prevents the separation of the outer silicone rubber coating from the roll even when silicone oil is applied thereto. The fuser member comprises a base member, a layer of a heat-resistant resin formed on the base member and a layer of a silicone rubber formed on the heat-resistant resin layer, the silicone rubber being vulcanized after the formation of the layer of silicone rubber on the resin layer. A primer layer may be used between the heat-resistant resin layer and the silicone rubber layer.

BRIEF SUMMARY OF THE INVENTION

According to the intents and purposes of the present invention, there is provided a NFFR structure for fusing color images at speeds in excess of 40 pages per minute (ppm).

The NFFR comprises a multilayered configuration including a smooth surfaced Viton™ outer layer which provides surface durability, high image gloss and excellent release characteristics. Superior release is effected using an outer layer of about 10 $\mu$m of relatively non-conductive unfilled Viton™ in combination with an inner conductive layer of Viton™ having a thickness of about 40 $\mu$m. The relatively non-conductive outer layer of Viton™ has a conductivity of about 0.17 w/m° C. while the conductive inner layer has a conductivity in the order of 0.25–0.4 w/m° C. By using relatively non-conductive Viton™ and conductive Viton™ in the specified thicknesses and conductivities, there is provided a NFFR structure which has excellent release life, is durable and produces high gloss images without significantly impeding heat flow.

The above structure replaces 50 $\mu$m of Viton™ normally found in other fuser rolls to prevent penetration of silicone oil into the base rubber.

DESCRIPTION OF THE PREFERRED EMBODIMENT(S) OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
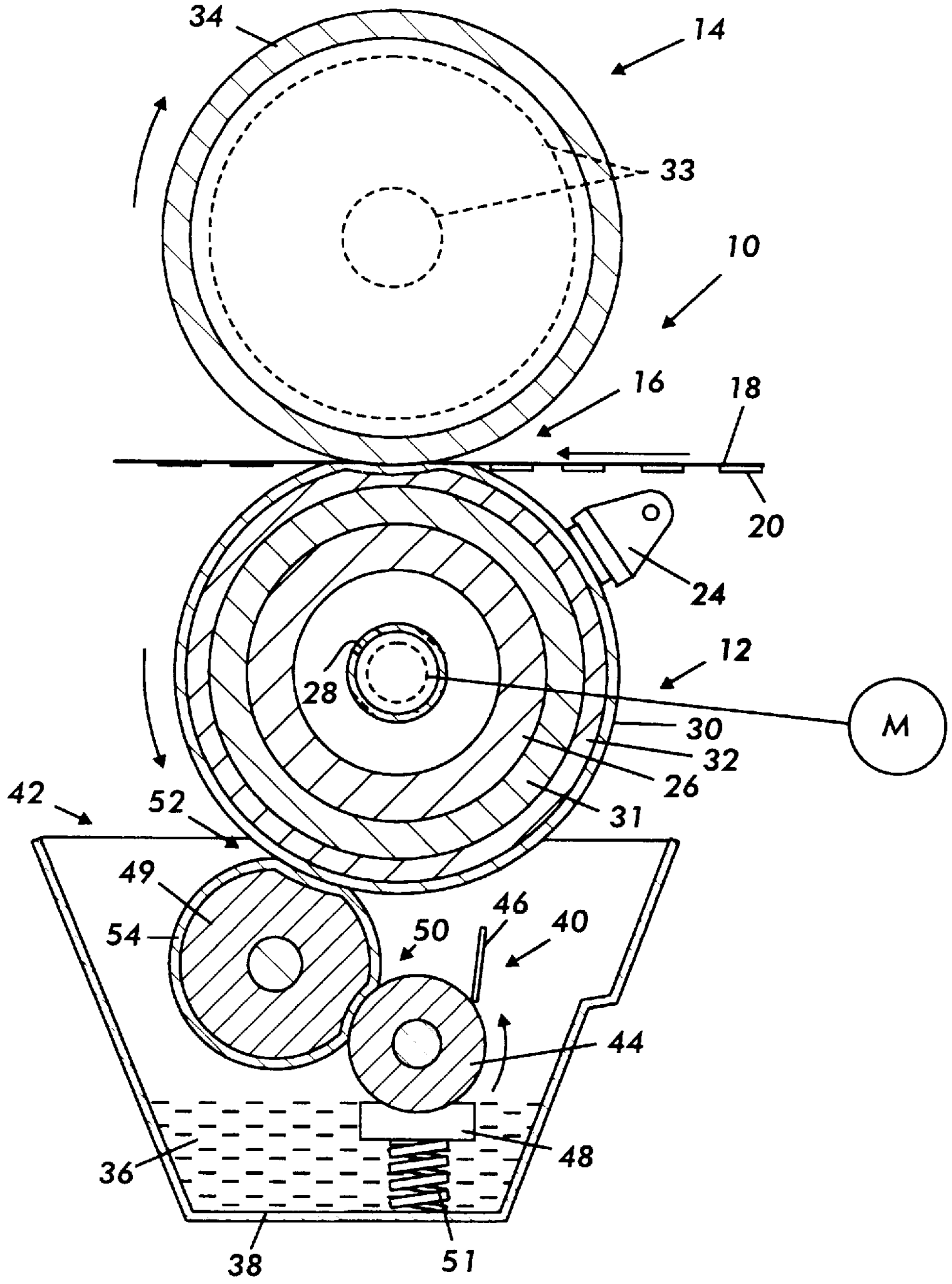
FIG. 1 is a schematic representation of a heat and pressure fuser incorporating the invention.

For a general understanding of the features of the present invention, reference is made to the drawings. In the drawings, like reference numerals have been used throughout to identify identical elements. FIG. 1 discloses a multilayered Nip Forming Fuser Roll (NFFR) fuser structure generally indicated by reference character 10.The drawing is a NFPR fuser not an NFFR. I attached an example of an NFFR drawing. The fuser apparatus comprises a heated roll structure 12 cooperating with a non-heated backup roll structure 14 to form a nip 16 through which a copy substrate 18 passes with toner images 20 formed thereon in a well known manner. The toner images 20 contact the heated roll structure while a force is applied between the roll structures in a well known manner to create pressure therebetween resulting in the deformation of the heated fuser roll structure by the nonheated pressure roll structure to thereby form the nip 16.

As the substrate passes out of the nip, substrates generally are self stripping except for very light weight ones. These substrates require a guide to lead them away from the fuser roll. After separating from the fuser roll, substrates are free to move along a predetermined path toward the exit of the machine (not shown) in which the fuser apparatus 10 is to be utilized.

Figure 2:
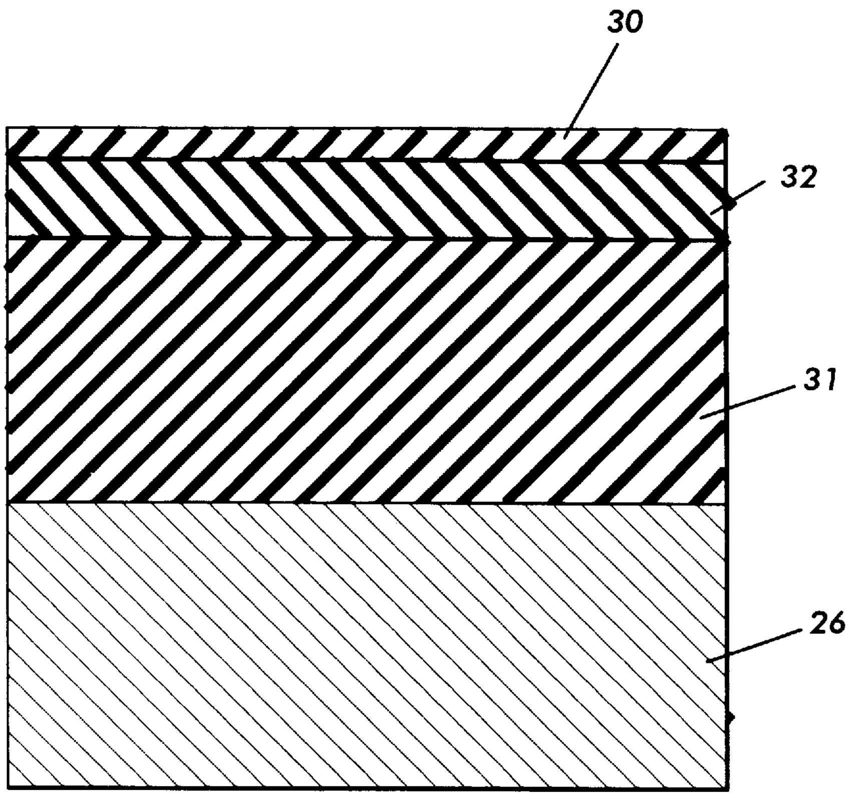
FIG. 2 is a is plan view of a fuser roll structure incorporating the novel arrangement of discrete layers of materials according to the present invention.

A contact temperature sensor 24 is provided for sensing the surface temperature of the roll structure 12 and in conjunction with conventional circuitry (not shown) maintains the surface temperature to a predetermined value, for example, on the order of 375–400° F. The heated roll structure 12 comprises a core or hollow cylinder or core 26 having a radiant quartz heater 28 disposed in the hollow thereof. When suitably energized via the aforementioned circuitry, the heating element radiates heat to the cylinder which is then conducted to the outer surface. Fuser roll is constructed of multiple layers. First layer attached to the core is generally a conductive slicone rubber having a conductivity in the order of 0.4 to 0.7 w/m° C. In order to prevent penetration of silicone oil into the base layer, two layers of Viton are used. First layer of 40 $\mu$m of Viton is a thermally conductive Viton in the order of 0.25 to 0.4 w/m° C. The outer 10 $\mu$m Viton is relatively non-conductive, smooth-surfaced outer layer 30 of the structure 12. Pursuant to the intents and purposes of the invention, the layer 30 preferably comprises Viton™ (trademark of E. I. du Pont Nemours & Co. for a fluoroelastomer based on the copolymer of vinylidene fluoride and hexafluoropropylene) which is relatively thin, having a thickness of about 10 $\mu$g (FIG. 2). The conductivity of the outer layer is about 0.17 w/m° C.

A base layer 31 which is adhered to the core 26 comprises a relatively thick layer of conductive silicone rubber. A typical thickness for inner layer 31 is in the order of 1–3 mm, the conductivity thereof being in the order of 0.5–0.8 w/m° C. The conductivity of the base member is effected in a conventional manner by adding conductive materials to the silicone rubber. The conductive silicone rubber layer retains sufficient deformability to be used in a NFFR structure notwithstanding the presence of the conductive material.

An inner layer 32 adhered to both the outer layer 30 and inner layer 31 has an intermediate thickness of about 40 $\mu$m and like the outer layer 30 is fabricated from Viton™. However, unlike the outer layer 30, the inner layer 32 is rendered thermally conductive using appropriate metallic and/or non-metallic fillers well known in the art to provide a conductivity in the order of 0.25–0.4 w/m° C. The layers of Viton™ and silicone rubber and fabricated and are adhered to each other by various techniques known in the prior art. For example, the Viton™ layers may be formed by spraying or flow coating while the silicone rubber layer may be molded. The base layer with the outer and inner layers adhered thereto is adhered to the core 26 in any suitable manner. Viton™ is rendered abhesive by the use of appropriate functional silicone oils such as Mercapto or amino oils.

The Viton™ outer layer 30 together with the inner Viton layer 32 form a barrier layer between the layer 31 and a substrate carrying toner images for preventing oil penetration into the base layer while allowing adequate heat flow therethrough thereby enabling said NFFR to be utilized for high speed fusing of color toner images.

The outer and inner layers 30 and 32 exhibit good release, durability and produce high gloss toner images with only a minimal impedance to heat dissipation compared to prior art devices. The inner conductive layer 32 and the base layer 31 provide for excellent transfer of thermal energy from the heat source 28.

Because of the low thermal impedance of the combination of layers 30 and 32, a machine in which fuser is utilized can be operated at a speed of approximately 50% faster than without the fuser structure disclosed herein. In other words, the machine for which the instant NFFR is provided can operate at 100 pages per minute (ppm) instead of 70 ppm. The increase in speed is attained without sacrificing toner release, durability or image gloss properties.

The backup roll structure 14 comprises a metal core 33 to which is adhered a relatively thin layer 34 of a suitable abhesive material. The layer 34 may be provided with a sleeve of suitable material (not shown) Due to the relative constructions of the fuser roll structure 12 and pressure roll structure 14, the fuser roll is deformed by the harder pressure roll structure when the required pressure is applied therebetween, the pressure being a function of the desired deformation which corresponds to the desired length of the nip 16.

While the outer layer 30 is not adequately abhesive, it has been found desirable to coat this layer with a release agent material 36 contained in a sump 38. The material 36 comprises a polymeric release agent material such as mercapto or aminosilicone oil.

For the purpose of coating the heated roll structure 12 there is provided a Release Agent Management (RAM) system generally indicated by reference character 40. The mechanism 40 comprises a donor roll 42, metering roll 44, doctor blade 46 and a wick 48. The metering roll 44 is partially immersed in the release agent material 36 and is supported for rotation such that it is contacted by the donor roll 42 which, in turn, is supported so as to be contacted by the heated roll structure 12. As can be seen, the orientation of the rolls 42 and 44 is such as to provide a path for conveying material 36 from the sump to the surface of the heated roll structure 12. The metering roll is preferably a nickel or chrome plated steel roll having a 4–32 AA finish. The metering roll has an outside diameter of 1.0 inch. As mentioned above, the metering roll is supported for rotation, such rotation being derived by means of the positively driven heated roll structure 12 via the rotatably supported donor roll 42. In order to permit rotation of (at a practical input torque to the heated roll structure 12) the metering roll 44 in this manner the donor roll 42 comprises a deformable layer 49 which forms a first nip 50 between the metering roll and the donor roll and a second nip 52 between the latter and the heated roll. The nips 50 and 52 also permit satisfactory release agent transfer between the rolls and roll structure. Suitable nip lengths are about 0.10 inch.

Wick 48 is fully immersed in the release agent and contacts the surface of the metering roll 44. The purpose of the wick is to provide an air seal which disturbs the air layer formed at the surface of the roll 44 during rotation thereof. If it were not for the function of the wick, the air layer would be coextensive with the surface of the roll immersed in the release agent thereby precluding contact between the metering roll and the release agent.

The wiper blade 46 preferably fabricated from Viton is ¾x⅛ in cross section and has a length coextensive with the metering roll. The edge of the blade contacting the metering roll has a radius of 0.001–0.010 inch. The blade functions to meter the release agent picked up by the roll 44 to a predetermined thickness, such thickness being of such a magnitude as to result in several microliters of release agent consumption per copy. The donor roll 42 has an outside diameter of 1.0 inch when the metering roll's outside diameter equals 1.0 inch. It will be appreciated that other dimensional combinations will yield satisfactory results. For example, 1.5 inch diameter rolls for the donor and metering rolls have been employed. The deformable layer 49 of the donor roll preferably comprises overcoated silicone rubber. However, other materials may also be employed.

A thin sleeve 54 on the order of several mils, constitutes the outermost surface of the roll 42, the sleeve material comprises Teflon, Viton or any other material that will impede penetration of silicone oil into the silicone rubber. While the donor rolls may be employed without the sleeve 54, it has been found that when the sleeve is utilized, the integrity of the donor roll is retained over a longer period and contaminants such as lint on the heated roll 12 will not readily transfer to the metering roll 44. Accordingly, the material in the sump will not become contaminated by such contaminants.

As may now be apparent from the forgoing disclosure, there is provided a NFFR which enables a color toner imaging machine to operate at speeds up to 100 ppm. To this end, there is provided a multilayered NFFR structure exhibiting heat transfer properties allowing it to operate at a set point temperature of 380° F. and at a speed increase of approximately 50% over prior fusers. The NFFR of the present invention operates at this speed increase while exhibiting good wear resistance, good release characteristics and high image gloss capabilities. The forgoing features are attained by the provision of a multilayered NFFR having a combination of Viton layers which cooperate to provide good toner release, high image gloss and good wear resistance properties. The relatively thin nonconductive Viton™ outer layer in combination with a conductive Viton™ layer of intermediate thickness provide the necessary thickness over the relatively thick conductive silicone rubber base to insure that the silicone oil used to improve release does not penetrate the silicone rubber, without unduly impeding heat flow to the outer surface of the NFFR. The conductive silicone rubber base layer provides both stability and thermal conductivity for transferring heat from the internal heat source outwardly to the outer surface of the fuser roll structure while being deformable.

I claim:

1. A multilayered NFFR structure for fusing color toner images to a substrate, said fuser structure comprising:

a rigid core member;

an abhesive, relatively non-conductive outer layer having a smooth surface for contacting a substrate and toner images carried thereby, said outer layer being non-susceptible to swelling by silicone oil;

an abhesive, relatively conductive inner layer comprising the same material as said relatively non-conductive outer layer and having a thickness of about four times that of said outer layer; and an abhesive, deformable, conductive base layer, said base layer being adhered to said rigid core member and supporting said inner layer which, in turn, supports said outer layer;

said outer and inner layers forming a barrier between said substrate with toner images and said base layer for preventing silicone oil release material from contacting said base layer and for preventing contact between said base layer and said substrate with toner images while allowing adequate heat flow therethrough thereby enabling said NFFR to be utilized for high speed fusing of color toner images.

2. Structure according to claim 1 wherein said outer layer has a thickness of about 10 $\mu$m.

3. Structure according to claim 2 wherein the thermal conductivity of said outer layer is about 0.17 w/m° C.

4. Structure according to claim 3 wherein said inner layer has a thermal conductivity in the order of 0.25–0.4 w/m° C.

5. Structure according to claim 4 wherein said inner layer has a thickness about 40 $\mu$m thick.

6. Structure according to claim 5 wherein said base layer has a conductivity in the order of 0.5–0.8 w/m° C.

7. Structure according to claim 6 wherein said base layer has a thickness in the order of 1–3 mm thick.

8. Structure according to claim 7 wherein said outer and inner layers comprise Viton™.

9. Structure according to claim 8 wherein said base layer comprises silicone rubber.

10. Heat and pressure fuser apparatus, said fuser comprising:

a multilayered NFFR structure including:

a rigid core member;

an abhesive, relatively non-conductive outer layer having a smooth surface for contacting a substrate and toner images carried thereby, said outer layer being non-susceptible to swelling by silicone oil;

an abhesive, relatively conductive inner layer comprising the same material as said relatively non-conductive outer layer and having a thickness of about four times that of said outer layer; and an abhesive, deformable, conductive base layer, said base layer being adhered to said rigid core member and supporting said inner layer which, in turn, supports said outer layer;

said outer and inner layers forming a barrier between said substrate with toner images and said base layer for preventing silicone oil release material from contacting said base layer and for preventing contact between said base layer and said substrate with toner images while allowing adequate heat flow therethrough thereby enabling said NFFR to be utilized for high speed fusing of color toner images.

11. A heat and pressure fuser according to claim 10 wherein said outer layer has a thickness of about 10 $\mu$m.

12. A heat and pressure fuser according to claim 11 wherein the thermal conductivity of said outer layer is about 0.17 w/m° C.

13. A heat and pressure fuser according to claim 12 wherein said inner layer has a thermal conductivity in the order of 0.25–0.4 w/m° C.

14. A heat and pressure fuser according to claim 13 wherein said inner layer has a thickness about 40 $\mu$m thick.

15. A heat and pressure fuser according to claim 14 wherein said base layer has a conductivity in the order of 0.5–0.8 w/m° C.

16. A heat and pressure fuser according to claim 15 wherein said base layer has a thickness in the order of 1–3 mm thick.

17. A heat and pressure fuser according to claim 16 wherein said outer and inner layers comprise Viton.

18. A heat and pressure fuser according to claim 17 wherein said base layer comprises silicone rubber.

* * * * *